March 22, 1932.  F. SCHRÖTER  1,850,569
RADIO RECEIVING SYSTEM
Filed June 11, 1928
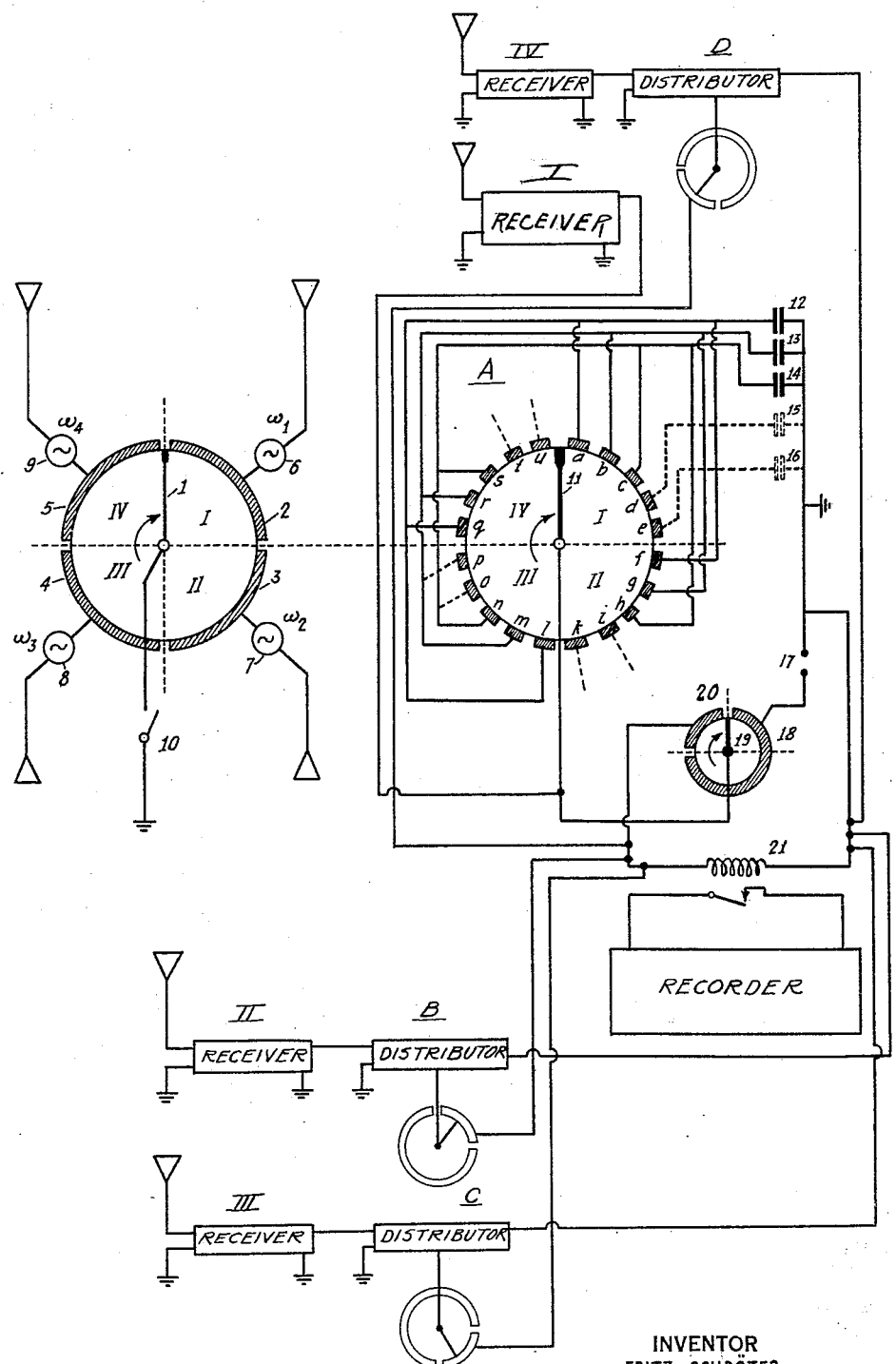
INVENTOR
FRITZ SCHRÖTER
BY
ATTORNEY Patented Mar. 22, 1932

1,850,569

UNITED STATES PATENT OFFICE

FRITZ SCHRÖTER, OF BERLIN, GERMANY, ASSIGNOR TO TELEFUNKEN GESELLSCHAFT FÜR DRAHTLOSE TELEGRAPHIE M. B. H., OF BERLIN, GERMANY, A CORPORATION OF GERMANY

RADIO RECEIVING SYSTEM

Application filed June 11, 1928, Serial No. 284,286, and in Germany June 25, 1927.

It is known from practical experience that, apart from the signals directly received at the receiving station from the transmitter, the same signals are coming in at the receiving station one or more times according to whether they travel one or more times around the earth, with the result that normal operation and traffic is disturbed. In order to obviate trouble of this kind the suggestion has been made to send out at the transmitter station the consecutive signals or signal groups at different frequencies (carrier waves or modulation waves), and to change at the receiving station the selective means in accordance with the frequency changes at the transmitter station and to separate or filter out the signals by other means. In a method of this kind, the energy of the signals coming in at the receiving station after having passed around the earth repeatedly goes to waste.

The present invention has for its principal object that of disclosing a method whereby also the energy of incoming signals are utilized after they have traveled around the earth. The method here to be specified may be utilized whenever a signal system is employed wherein the constituent signals are of like duration, as, for instance, in communication by means of the so-called five-unit code or a similar code.

The invention consists in that the directly arriving signals are not used at once for influencing the indicator instrument, but that the electrical or magnetic actions produced thereby are first integrated with or added to the actions produced by recurring signals, whereupon such integrated action is caused finally to influence the indicator.

The basic idea of the invention shall be explained by the aid of the practical example shown as a single figure in the accompanying drawing. The left-hand side of the figure shows diagrammatically a sending station, while a receiving station is shown on the right-hand side. The two contact arms or wipers 1 and 11 run in synchronism so that they are practically at the same instants (save for the time required for the propagation of the wave from the sender to the receiver station) in the same quadrants I, II, III or IV of a contact disk. For the sake of simplicity the assumption shall be made first that the sender is transmitting impulses only as long as the contact arm 1 is on segment 2.

The impulses, in accordance with the above assumption, are given off by way of a contact 10 in such a way that at the receiving end the segments $a$, $b$, $c$, $d$ and $e$ will receive the impulses according to the signals. The number 5 chosen in the example would correspond to the five-unit code, so that, according to the particular segment among the five segments to which the impulses of a signal are supplied, different letters will be produced, it having to be noted, however, that when using the five-unit code, the number of the said segments may also be a multiple of five, as will be readily understood from what follows further below.

The currents flowing through the different segments according to the particular positions of contact arm or wiper 11, and being rectified by the receiver are supplied to the various storing or integrating condensers 12, 13, 14, 15 and 16. After passing over the first quadrant no further impulses shall for the time being be supposed to be transmitted from the transmitter. After complete circulation around the earth, the signals recur or are repeated at the receiving station at a time when the contact arm or wiper closes the contacts $f$, $g$, $h$, $i$, $k$ of the quadrant II. These direct current impulses, as can be seen from the drawing, are fed to the same condensers as before. While the wiper passes over the segments $l$, $m$, $n$, $o$, $p$, of quadrant III, such signals as are coming in after another circulation around the earth will again be fed to the same condensers. In quadrant IV by means of the contacts on segments $q$, $r$, $s$, $t$, $u$, discharge of the condensers for the purpose of signal indication or reading is effected by the aid of change-over switch 19. The latter revolves in synchronism with wiper 1, and while the quadrants I, II and III are being passed, it has conducted the currents fed at 17 by way of segment 18 and wiper 19 to the condensers, where as in its position at quadrant IV, it conducts the discharge currents of the condensers successively by way of segment 20 and the relay winding 21. This relay actuates an indicator, which, for instance, may be of the kind resembling a printing mechanism as in the Siemens high-speed telegraph, although it will be understood that also some other recording devices based upon the photographic principle could be used.

In order that, contradistinct from the case just examined, the complete time of rotation of wiper 1 at the transmitter end may be utilized for signal transmission, the method may be modified in so far as at the sending end the frequency whereby the signals are sent out, that is to say, either the carrier wave or the modulation frequency, is altered so that in quadrant I the frequency generated by generator 6 is $w1$, in quadrant II the frequency generted by the generator 7 is $w2$; in quadrant III the frequency is $w3$ and produced by generator 8; in quadrant IV the frequency $w4$ is generated by generator 9, with the result that, while the wiper 1 passes over the segments 2, 3, 4 and 5, transmission of impulses proceeds all the time, though in each case at a different wave-length. In order to separate the signals at the receiving end with systems utilizing four different wave-lengths, four distributor systems A, B, C and D of the kind described may be employed to which current is supplied by the use of a corresponding number of selection means or receivers I, II, III and IV tuned to the different waves. In this scheme, for instance, the second signal which arrives at the receiving station on a different wave-length, will be received or recorded or utilized for charging the corresponding condensers at a time when the first indicator means has not yet been operated, hence, the whole time is utilized for signal transmission.

Having thus described my invention, I claim:—

1. A system for receiving wireless signals and the like of equal duration including, means for receiving signals directly and indirectly from a transmitting station, means for storing up the direct and indirect signal energy to produce a combined signal effect substantially equal to the sum of all the signal effects, and indicating means for utilizing the stored up result of all of said signal effects.

2. A system for receiving wireless signals of like duration including, means for receiving a signal directly from a transmitting station and at a later period of time receiving the same signal indirectly from the same transmitting station, a plurality of capacity units associated with said signal receiving means for storing the combined signal energy received in said system, means operable at a definite period of time after the reception of said signals for discharging the stored energy from said capacity units, and means associated with said capacity discharging means for producing an indication of said received signals corresponding to said energy stored in said capacity units.

3. A system for receiving wireless signals and the like of similar duration including, a transmitting and a receiving station, a distributor device at each of said stations operating in synchronism with respect to both of said stations, a plurality of capacity units corresponding in number to the unit of code used for transmission associated with said distributing device at said receiving station, means provided by said last named distributing device for supplying a charge to said capacity unit for signals received directly from said transmitting station and at a later period of time supplying an additional charge to said capacity units for signals received indirectly from said transmitting station, means associated with said distributor device for discharging the energy stored in said capacity devices at predetermined intervals of time, and signal recording means responsive to the said discharged energy from said capacity devices for producing a record of the said received signals.

4. A system for receiving wireless signals and the like of equal duration including, means for receiving signals directly and indirectly from a transmitting station, a plurality of capacity units for storing all of said received signal energy, means for controlling the period of time during which said signal energy is supplied to said capacity, means for discharging said capacity unit during a fixed predetermined time and producing current pulses of duration corresponding to an integration of the combined received signal effects as stored in said capacity units, and signal reproducing means responsive to said current pulses from said capacity units for producing an effect corresponding to the integrated effect of both directly and indirectly received signals.

5. A method of communication which consists in transmitting signals of equal duration, collecting original signal energy collecting recurring signal energy, storing up the original energy adding thereto the recurring energy, and utilizing the total energy to record the original signals.

6. A method of wireless communication which consists in transmitting signals of equal duration on different frequencies, selectively collecting original signal energy and recurring signal energy, independently integrating the original and recurring energy of each frequency, and utilizing the integrated energy of each frequency to record the original signals.

7. A system for receiving wireless signals which includes means for receiving a signal directly from a transmitting station and, at a later period of time, indirectly from the same transmitting station, means connected with the signal receiving means for storing the uncombined direct and indirect signal energy, means operable at a predetermined period of time after the reception of said signals for discharging the stored energy, and utilizing means connected to said discharging means for recording the said signal energy.

FRITZ SCHRÖTER.